R. BEAN.
Double Acting Pump.
No. 9,475. Reissued Nov. 23, 1880.
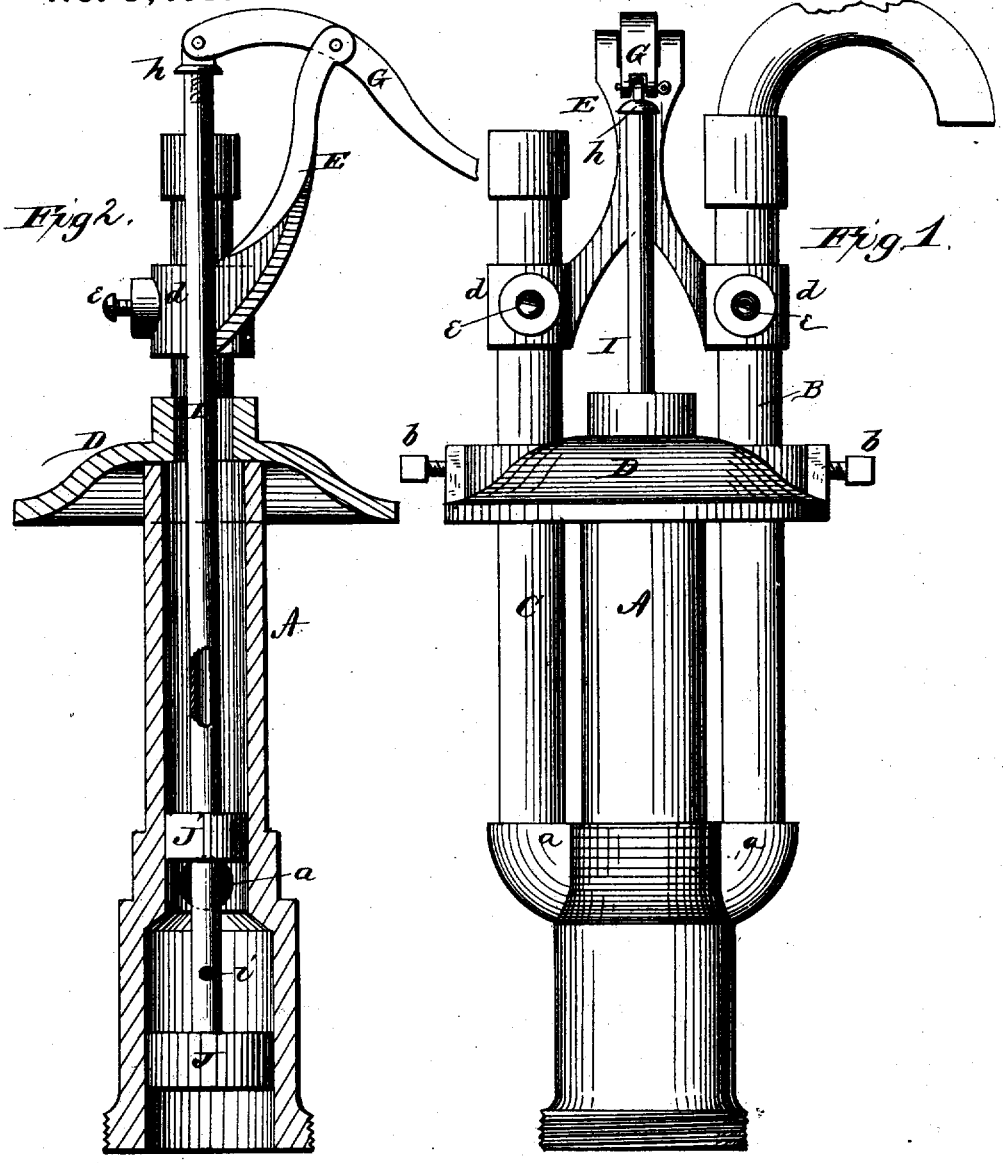
Witnesses,
Franck L. Ormsby
J. J. McCarthy.
Inventor:
Roscoe Bean
By Alexander Mason
Atty
N. PETERS, PHOTO-LITHOGRAPHER, WASHINGTON, D. C.

UNITED STATES PATENT OFFICE.

ROSCOE BEAN, OF SPRINGFIELD, OHIO.

DOUBLE-ACTING PUMP.

SPECIFICATION forming part of Reissued Letters Patent No. 9,475, dated November 23, 1880.

Original No. 197,032, dated November 13, 1877. Application for reissue filed June 14, 1880.

*To all whom it may concern:*

Be it known that I, ROSCOE BEAN, of Springfield, in the county of Clarke, and State of Ohio, have invented certain new and useful Improvements in Pumps; and I do hereby declare that the following is a full, clear, and exact description thereof, reference being had to the accompanying drawings, and to the letters of reference marked thereon, which form a part of this specification.

The nature of my invention consists in the construction and arrangement of a pump, as will be hereinafter more fully set forth.

In order to enable others skilled in the art to which my invention appertains to make and use the same, I will now proceed to describe its construction and operation, referring to the annexed drawings, in which—

Figure 1 is a side elevation of my improved pump, and Fig. 2 is a central vertical section of the same.

A represents the cylinder of my pump, formed with two branches or projections, *a a*, with openings in the top of the branches communicating with the interior of the cylinder. In one of these openings is screwed the discharge-pipe B and in the other a pipe or rod, C. If this latter is a tube, its upper end should be closed.

D represents the platform-flange, having suitable apertures for the passage of the pipe B and pipe or rod C, and also for the pump-actuating rod I, and said platform-flange is fastened to the parts B C by means of set-screws *b b*, or, more properly speaking, the pump is suspended below the platform-flange by the set-screws holding the parts B C therein. By this means the pump can be easily raised or lowered, as may be required, without loosening the platform-flange from the curb or other support.

E represents the handle-standard, having its lower end forked and formed with sleeves or sockets *d d*, through which the parts B C are passed, and the standard then fastened by means of set-screws *e e*. This standard can thus be adjusted to any height desired and easily fastened in position.

G is the pump-handle, pivoted in the top of the standard E and connected to the pump-rod I. The actuating-rod I is a tube closed at its upper end and arranged to attach to the pump-handle at its upper end. At a suitable distance below and around the pump-rod is a packing, J′, which may be either movable or stationary, and below this packing, at a suitable distance, is a bucket or sucker, J.

Between the sucker and packing there is an opening, *i*, in the pump-actuating rod, so as to use the same for an air-chamber.

If the packing J′ is movable with the actuating-rod, I increase the size of the packing and make it in form of a plunger or bucket, so that in connection with the air-chamber a more even stream may be obtained.

The packing J′ is arranged to prevent the escape of water, if either stationary or movable.

The cylinder A may be constructed, as shown, of unequal diameter, the lower or suction bucket working in the large bore and the upper or force bucket in the smaller bore.

The object of this arrangement is that while the lower bucket is drawing water from the bottom at the same time it is forcing one-half of the water into the upper part of the cylinder and the other half out at the spout. In returning the balance of the water is discharged, making, in connection with the air-chamber in the pump-actuating rod I, an even-stream or flow of water.

It will be seen that in the pump as thus constructed the pipes C and B not only serve to support the actuating mechanism of the pump, but also as an auxiliary air-chamber and exit-pipe for the pump, the two pipes in their arrangement adding greatly to the compactness of the whole.

Having thus fully described my invention, what I claim as new, and desire to secure by Letters Patent, is—

1. The combination of a pump-cylinder, A, discharge-pipe B, tube or rod C, and the stationary platform-flange D, the entire pump proper being adjustably suspended below said platform, substantially as and for the purposes herein set forth.

2. The adjustable handle-standard, forked at its lower end and formed with sleeves or sockets having set-screws, as described, in combination with a pump having upwardly-projecting tubes, or one tube and one rod, substantially as herein set forth.

3. In a pump, a hollow rod, I, used as an air-chamber, in combination with two buckets of unequal size attached to it and an air-discharge between the two buckets, substantially as and for the purposes herein set forth.

4. The hollow rod I, having opening *i* and provided with a sucker, J, and packing J′ within the cylinder A, in combination with the pipes C and B, one serving as an auxiliary air-chamber and the other as an exit-pipe, and the two as supports for the operating mechanism of the pump, substantially as specified.

5. In combination with the pump-cylinder having two unequal diameters and the sucker and packing therein, the main and auxiliary air-chambers and exit-pipe, substantially as specified.

In testimony that I claim the foregoing I have hereunto set my hand this 8th day of June, 1880.

ROSCOE BEAN.

Witnesses:
F. B. STONE,
W. R. HOMER.